(12) United States Patent
Francis

(10) Patent No.: US 11,346,418 B2
(45) Date of Patent: May 31, 2022

(54) COVERED RETAINER FOR SEGMENTED ANNULAR HEAT SHIELD

(71) Applicant: GOODRICH CORPORATION, Charlotte, NC (US)

(72) Inventor: Brian P. Francis, Russia, OH (US)

(73) Assignee: Goodrich Corporation, Charlotte, NC (US)

( * ) Notice: Subject to any disclaimer, the term of this patent is extended or adjusted under 35 U.S.C. 154(b) by 613 days.

(21) Appl. No.: 16/358,302

(22) Filed: Mar. 19, 2019

(65) Prior Publication Data

US 2020/0300320 A1    Sep. 24, 2020

(51) Int. Cl.

| F16D 65/847 | (2006.01) |
|---|---|
| B60B 21/00 | (2006.01) |
| B64C 25/00 | (2006.01) |
| F16B 5/06 | (2006.01) |
| F16D 65/78 | (2006.01) |
| B60B 3/00 | (2006.01) |

(52) U.S. Cl.
CPC .............. *F16D 65/847* (2013.01); *B60B 3/00* (2013.01); *B60B 21/00* (2013.01); *B64C 25/001* (2013.01); *F16B 5/06* (2013.01); *B60B 2320/10* (2013.01); *B60B 2900/212* (2013.01); *B60B 2900/513* (2013.01); *F16D 2065/785* (2013.01)

(58) Field of Classification Search
CPC .. F16D 65/847; F16D 55/36; F16D 2065/785; B60B 3/00; B60B 21/00; B60B 2320/10; B60B 2900/212; B60B 2900/513; B64C 25/001; B64C 25/36; F16B 5/06
See application file for complete search history.

(56) References Cited

U.S. PATENT DOCUMENTS

| 3,051,528 | A | | 8/1962 | Rogers | |
|---|---|---|---|---|---|
| 3,829,162 | A | * | 8/1974 | Stimson | ................ F16D 65/123 |
| | | | | | 301/6.2 |
| 3,958,833 | A | * | 5/1976 | Stanton | ................... F16D 55/40 |
| | | | | | 301/6.2 |
| 4,017,123 | A | | 4/1977 | Horner et al. | |
| 4,084,857 | A | | 4/1978 | VanderVeen | |

(Continued)

FOREIGN PATENT DOCUMENTS

| EP | 0811511 | 12/1997 |
|---|---|---|
| EP | 1516754 | 3/2005 |
| ES | 2315540 | 4/2009 |

OTHER PUBLICATIONS

European Patent Office, European Search Report dated Jul. 13, 2020 in Application No. 19216281.6.

(Continued)

*Primary Examiner* — Kip T Kotter
(74) *Attorney, Agent, or Firm* — Snell & Wilmer L.L.P.

(57) ABSTRACT

A retainer for a segmented annular heat shield of a wheel includes a first end, a second end opposite the first end, and a body extending between the first end and the second end. Both the first end and the second end are configured to be coupled to at least one of the wheel and a torque bar. Further, the body includes opposing longitudinal sides configured to respectively engage and secure a respective heat shield segment of the segmented annular heat shield. Also, the retainer includes a cover coupled to and extending over at least the body, with an air gap being defined between the body and the cover.

16 Claims, 14 Drawing Sheets

(56) References Cited

U.S. PATENT DOCUMENTS

| | | | |
|---|---|---|---|
| 4,856,619 A | | 8/1989 | Petersen |
| 5,107,968 A | * | 4/1992 | Delpassand ............. B60C 23/18 188/264 G |
| 5,236,249 A | | 8/1993 | Han et al. |
| 5,248,013 A | | 9/1993 | Hogue et al. |
| 5,851,056 A | | 12/1998 | Hyde |
| 5,899,485 A | | 5/1999 | Folsom et al. |
| 7,051,845 B2 | * | 5/2006 | Thorp ..................... F16D 55/36 188/71.6 |
| 8,157,062 B2 | * | 4/2012 | Enright ................... F16D 55/36 188/71.5 |
| 8,668,276 B2 | | 3/2014 | Hall et al. |
| 2009/0071763 A1 | | 3/2009 | Thorp et al. |
| 2010/0025172 A1 | | 2/2010 | Campbell |
| 2013/0015697 A1 | | 1/2013 | Hall et al. |
| 2017/0174330 A1 | * | 6/2017 | Rook ..................... B64C 25/44 |

OTHER PUBLICATIONS

European Patent Office, European Search Report dated Aug. 5, 2020 in Application No. 19215768.3.

* cited by examiner

COVERED RETAINER FOR SEGMENTED ANNULAR HEAT SHIELD

FIELD

The present disclosure relates to wheel assemblies, and more specifically to a cover coupled to a retainer for a segmented annular heat shield of a wheel assembly.

BACKGROUND

Aircraft typically include landing gear for supporting the aircraft above a ground surface and for allowing the aircraft to move relative to the ground surface while remaining supported by the ground surface. The landing gear may include one or more wheel assemblies. Most wheel assemblies include a brake assembly to decelerate or park the aircraft. Aircraft braking, especially during landing, tends to generate significant heat that can damage components of the wheel assembly if such components are not properly shielded. While annular heat shields provide thermal protection, the logistics of assembling, repairing, and/or replacing conventional annular heat shields are burdensome.

SUMMARY

In various embodiments, the present disclosure provides a retainer for a segmented annular heat shield of a wheel. The retainer may include a first end, a second end opposite the first end, and a body extending between the first end and the second end. Both the first end and the second end may be configured to be coupled to at least one of the wheel and a torque bar. Further, the body may include opposing longitudinal sides configured to respectively engage and secure a respective heat shield segment of the segmented annular heat shield. Also, the retainer may include a cover coupled to and extending over at least the body, with an air gap being defined between the body and the cover.

In various embodiments, each of the opposing longitudinal sides comprises a groove for receiving an edge of the respective heat shield segment. In various embodiments, the cover includes opposing longitudinal edges that respective wrap-around and are disposed within the groove. In various embodiments, the cover is detachably coupled to the body, and thus extends between the first end and the second end. In various embodiments, the cover is configured to be slid onto the body. Further, the body may include at least one tab disposed proximate the first end, and the at least one tab may be configured to be bent after the cover is slid onto the body to secure the cover in place.

In various embodiments, at least one of the body and the second end comprises a shoulder against which the cover is engaged. The cover may be held between the shoulder and the at least one tab to maintain at least one of a position and an orientation of the cover relative to the retainer. In various embodiments, the first end defines an aperture for receiving a torque bar bolt. In such embodiments, the aperture may be a first aperture, the second end may comprise a flange, the flange may define a second aperture through which a torque bar pin of a torque bar is configured to extend, and the flange may extend substantially perpendicular to the body such that the first aperture and the second aperture lie in perpendicular planes. In various embodiments, the above mentioned shoulder is a first shoulder, and at least one of the body, the first end, and the second end of the retainer includes a second shoulder configured to engage a torque bar to maintain at least one of a position and an orientation of the retainer relative to the torque bar.

Also disclosed herein, according to various embodiments, is a wheel assembly. The wheel assembly may include an inboard wheel portion having a rim and a disk. A radially inward surface of the rim and an inboard surface of the disk may define a wheel well cavity configured to house a brake assembly. The wheel assembly may also include a torque bar (e.g., a torque bar of the brake assembly) mounted to the inboard wheel portion. Further, the wheel assembly may include a retainer coupled to the torque bar and disposed radially between the torque bar and the radially inward surface of the rim of the inboard wheel portion. The retainer may include opposing longitudinal sides configured to respectively engage and retain a respective heat shield segment of a segmented annular heat shield. The wheel assembly may further include a cover coupled to at least a portion of the retainer, with a first gap, a second gap, and a third gap being defined between the torque bar and the radially inward surface of the rim of the inboard wheel portion. In various embodiments, the cover is disposed radially between the torque bar and the retainer, the first air gap is defined between the torque bar and the cover, the second air gap is defined between the cover and the retainer, and the third air gap is defined between the retainer and the radially inward surface of the rim of the inboard wheel portion.

Also disclosed herein, according to various embodiments, is a method of assembling a wheel assembly. The method may include coupling a cover to a retainer, mounting a torque bar to an inboard wheel portion of the wheel assembly such that a retainer is disposed between the torque bar and a radially inward surface of a rim of the inboard wheel portion. The method may further include engaging a lateral edge of a heat shield segment with the retainer. Coupling the cover to the retainer may include sliding the cover over a body of the retainer and subsequently bending at least one tab to secure the cover in place.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1A:
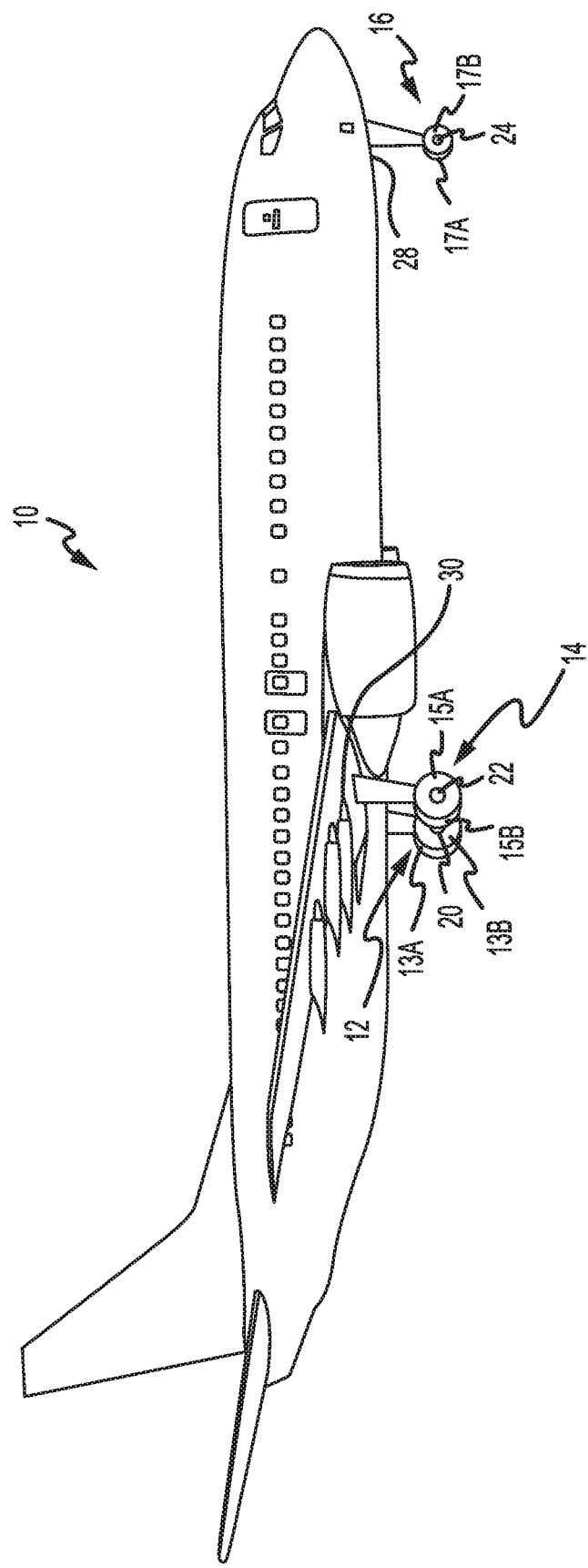
FIG. 1A illustrates an aircraft having multiple landing gear, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

Referring now to FIG. 1A, in accordance with various embodiments, an aircraft 10 includes landing gear, such as a left main landing gear 12, a right main landing gear 14, and nose landing gear 16. The left main landing gear 12, right main landing gear 14, and nose landing gear 16 typically support the aircraft 10 when the aircraft 10 is not flying, thereby allowing the aircraft 10 to taxi, take off, and land without damage. In various embodiments, the left main landing gear 12 includes a first wheel 13A and a second wheel 13B coupled by an axle 20. In various embodiments, the right main landing gear 14 includes a first wheel 15A and a second wheel 15B coupled by an axle 22. In various embodiments, the nose landing gear 16 includes a first nose wheel 17A and a second nose wheel 17B coupled by an axle 24. In various embodiments, the aircraft 10 comprises any number of landing gear(s), and each landing gear comprises any number of wheels. In various embodiments, the left main landing gear 12, right main landing gear 14, and nose landing gear 16 are retracted when the aircraft 10 is in flight. In various embodiments, one or more of the left main landing gear 12, right main landing gear 14, and nose landing gear 16 extends from an underside of a fuselage 28 of the aircraft 10, or from an underside of the wings 30 thereof.

In various embodiments, the aircraft 10 also includes a brake system that is applied to one or more of the wheels 13A, 13B, 15A, 15B, 17A, 17B of one or more of the respective left main landing gear 12, right main landing gear 14, and/or nose landing gear 16. Such brake systems of the aircraft 10 typically comprise a collection of assemblies, subsystems, and/or units that produce output signals for controlling the braking force and/or torque applied at one or more of the wheels 13A, 13B, 15A, 15B, 17A, 17B. Such brake systems typically communicate with the brakes of the left main landing gear 12, right main landing gear 14, and/or nose landing gear 16, and each brake is typically mounted to each wheel 13A, 13B, 15A, 15B, 17A, 17B in order to apply and release braking forces thereon. In various embodiments, the brakes of the aircraft 10 further include a non-rotatable wheel support, the wheels 13A, 13B, 15A, 15B, 17A, 17B mounted to the wheel support for rotation, and a brake disk stack.

Figure 1B:
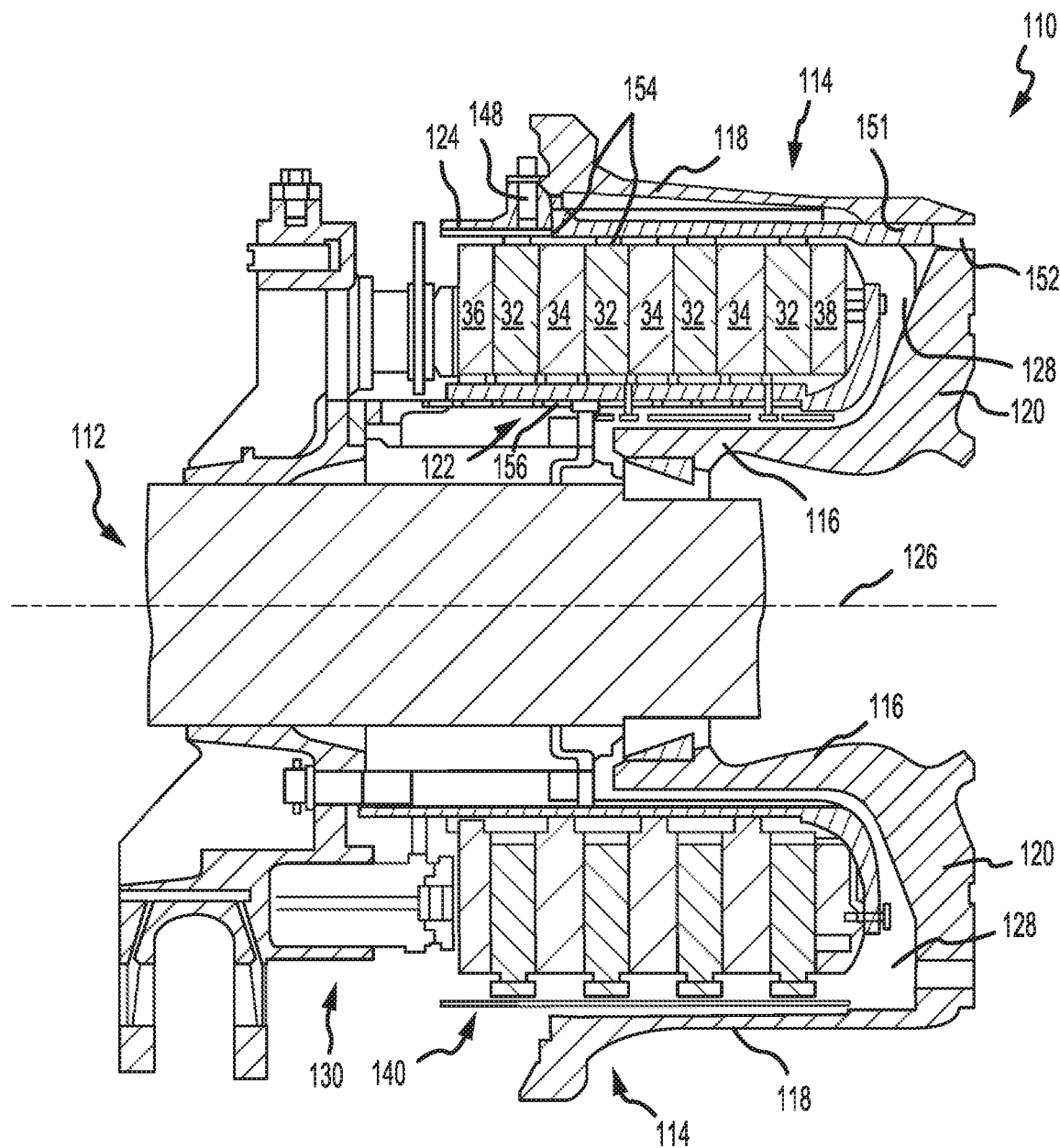
FIG. 1B illustrates a brake assembly, in accordance with various embodiments.

Referring now to FIG. 1B, a brake assembly 110 for an aircraft, such as aircraft 10 of FIG. 1A, is provided, in accordance with various embodiments. The brake assembly 110 interfaces with a bogie axle 112 and a wheel 114 (e.g., the wheels 13A, 13B, 15A, 15B, 17A, 17B of FIG. 1A) of the aircraft 10. The wheel 114 may include a hub 116, a disk 120 (also referred to as a web portion of a wheel), and a rim 118 (also referred to as a flange portion of a wheel). The wheel assembly and/or brake assembly 110 generally includes a torque take-out assembly (also referred to as a torque plate or a torque plate assembly) 122, one or more torque bars 124, a wheel rotational axis 126, a wheel well cavity 128, an actuator 130, multiple brake rotors 32, multiple brake stators 34, a pressure plate 36, an end plate 38, a heat shield 140, multiple torque bar bolts 148, a torque bar pin 151, a torque bar retention slot 152, multiple rotor lugs 154, and multiple stator slots 156, according to various embodiments.

Brake disks (e.g., the interleaved brake rotors 32 and brake stators 34) are disposed in the wheel well cavity 128 that is generally and collectively defined by the rim 118, the disk 120, and the hub 116. The brake rotors 32 are typically secured to the torque bars 124, which are coupled to the rim 118 of the wheel 114, for rotating with the wheel 114. The brake stators 34 are typically engaged with the torque take-out assembly (e.g., torque plate assembly) 122. At least one actuator 130 is typically operable to compress the interleaved brake rotors 32 and brake stators 34 for stopping the aircraft 10 of FIG. 1A. In the embodiment of FIG. 1B, the actuator 130 is shown as a hydraulically actuated piston, though electronically actuated pistons are contemplated herein. The pressure plate 36 and end plate 38 are disposed at opposite ends of the interleaved brake rotors 32 and brake stators 34.

Through compression of the brake rotors 32 and brake stators 34 between the pressure plate 36 and end plate 38, the resulting frictional contact slows, stops, and/or prevents rotation of the wheel 114. The torque take-out assembly 122 is typically secured to a stationary portion of a landing gear truck, such as a bogie beam or other landing gear strut, such that the torque take-out assembly 122 and brake stators 34 are prevented from rotating during braking of the aircraft 10 of FIG. 1A. The brake rotors 32 and brake stators 34 are typically fabricated from various materials, such as, for example carbon materials. The brake disks typically withstand and dissipate the heat generated from contact between the brake disks while braking the aircraft 10 of FIG. 1A.

Figure 2:
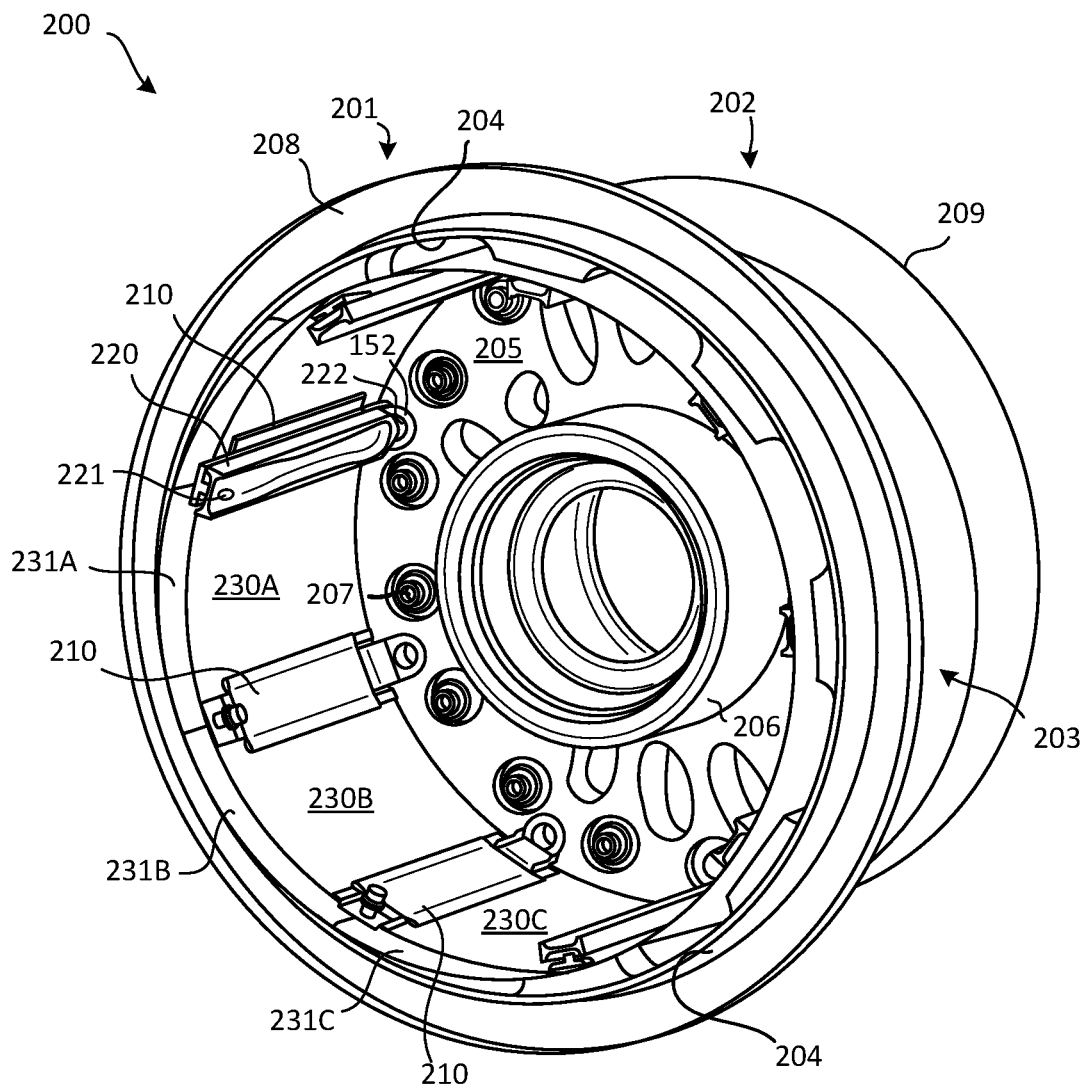
FIG. 2 is a perspective view of a wheel assembly, in accordance with various embodiments.

According to various embodiments and with reference to FIG. 2, a wheel assembly 200, which may be similar to wheels 13A, 13B, 15A, 15B, 17A, 17B of FIG. 1A, is provided. The wheel assembly 200 may be a split wheel assembly and thus may comprise an inboard wheel portion 201 and an outboard wheel portion 202. Wheel portions 201, 202, for example, may be referred to as wheel halves. The wheel assembly 200 may be implemented with any landing gear of the aircraft 10 (e.g., any of the landing gears mentioned above with reference to FIG. 1A), and the wheel assembly 200 may be an inner/inboard wheel assembly or an outer/outboard assembly. Although numerous details are included herein pertaining to the implementation of the wheel assembly 200 in an aircraft, one skilled in the art will realize that a similar wheel assembly may be used in other vehicles, such as cars or motorcycles, and thus the scope of the present disclosure is not necessarily limited to aircraft wheel assemblies.

In various embodiments, inboard wheel portion 201 of wheel assembly 200 comprises a hub 206, a disk 205, and a rim 204. Radially outward surface of the rim 204 may define a tube-well 203. That is, tube-well 203 may be defined by respective flange sections of the inboard wheel portion 201 and the outboard wheel portion 202. The rim 204/tube-well 203 may be configured to receive a tire and may form a seal with tire to allow pressurized air to inflate the tire. In various embodiments, the inboard wheel portion 201 also includes a radially outward extending lip 208 located at an inboard end of the inboard wheel portion 201, and the outboard wheel portion 202 may also include a similar radially outward extending lip or rim 209 located at an outboard end of the outboard wheel portion 202.

In various embodiments, wheel assembly 200 includes tie bolts 207 that extend through the disk 205 to hold together the wheel portions 201, 202. Radially inward of, and generally defined by, the radially inward surface of the rim 204 is the wheel well cavity (e.g., 128 in FIG. 1B) where the brake assembly 110 is disposed. That is, the wheel well cavity 128 (FIG. 1B) generally refers to the volume bound by the rim 204 and the disk 205, according to various embodiments. The wheel assembly 200 includes, according to various embodiments, one or more retainers 210 and one or more torque bars 220. In FIG. 2, some of the torque bars 220 are in order to clearly show the retainers 210. Generally, each retainer 210 is disposed radially between a respective torque bar 220 and the radially inward surface of the rim 204, according to various embodiments.

For example, an inboard end of each torque bar 220 may be mounted to the rim 204 using a torque bar bolt 221 and an outboard end of each torque bar 220 may be mounted to the disk 205 via insertion of a torque bar pin 222 into a torque bar retention slot 152 of the disk 205. Each retainer 210 may be coupled to a respective torque bar 220, as described in greater detail below. Generally, the retainers 210 may be configured to engage and secure heat shield segments, such as heat shield segments 230A, 230B, 230C. That is, a plurality of heat shield segments 230A, 230B, 230C collectively form a segmented annular heat shield, and each of these segments 230A, 230B, 230C is held in place between circumferentially adjacent retainers 210, according to various embodiments. Additionally, the retainers 210 may provide a heat shielding benefit, as described in greater detail below. In various embodiments, the each heat shield segment 230A, 230B, 230C is a laminated, dimpled foil metallic heat shield.

Figure 3:
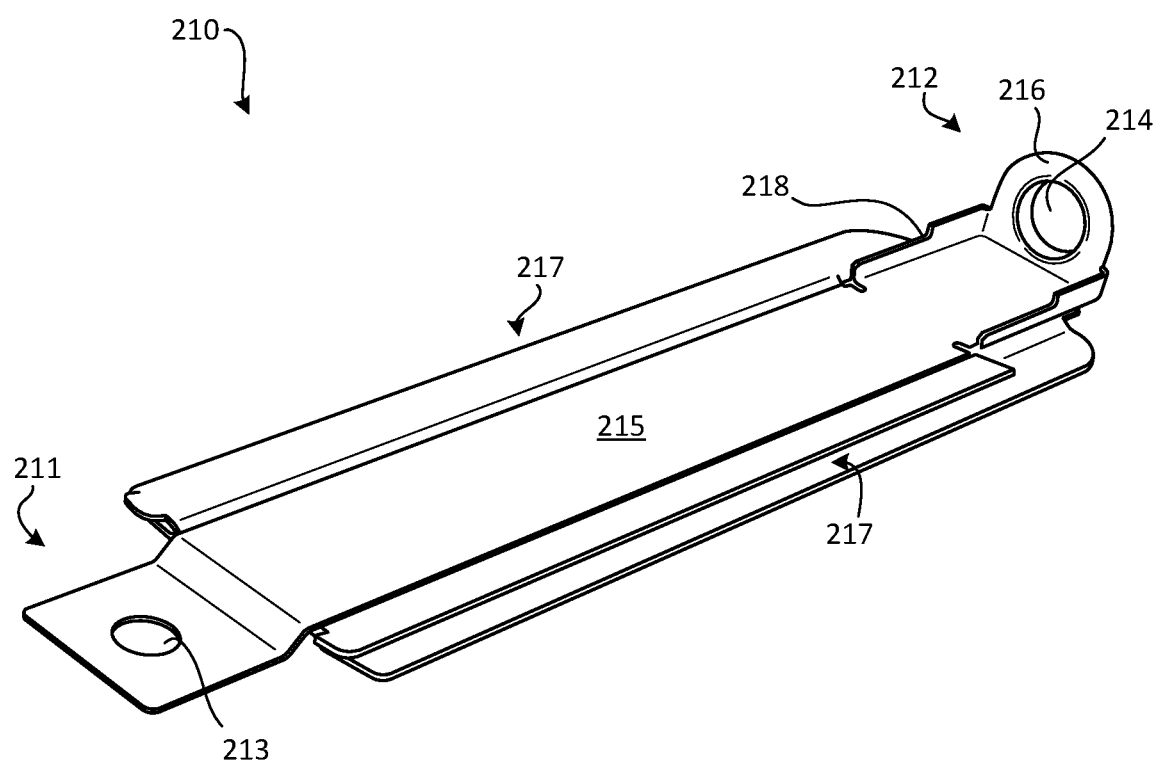
FIG. 3 is a perspective view of a retainer for a segmented annular heat shield, in accordance with various embodiments.

In various embodiments, and with reference to FIG. 3, a perspective view of the retainer 210 is provided. The retainer 210 may include a first end 211, a second end 212 opposite the first end 211, and a body 215 extending between the first end 211 and the second end 212. The body 215 may include opposing longitudinal sides 217 that are configured to respectively engage and secure a respective heat shield of the segmented annular heat shield. For example, each of the opposing longitudinal sides 217 of the body 215 of the retainer 210 may include/define a groove for receiving an edge of the respective heat shield segment.

In various embodiments, and with reference to FIGS. 2 and 3, the first end 211 and the second end 212 of the retainer 210 are both configured to be coupled to the wheel (rim 204 or disk 205) and/or the torque bar 220. For example, the first end 211 of the retainer 210 may define a first aperture 213 for receiving the torque bar bolt 221, and thus the torque bar bolt 221 may extend through both the inboard end of the torque bar and the first end 211 of the retainer 210. The second end 212 of the retainer 210 may comprise a flange 216, and the flange 216 may define a second aperture 214 through which the torque bar pin 222 of the torque bar 220 is inserted. That is, the second aperture 214 defined in the flange 216 may fit around the torque bar pin 222 in order to secure the second end 212 relative to the torque bar 220. In various embodiments, the flange extends radially inward. Accordingly, because the body 215 of the retainer 210 may extend substantially axially (e.g., parallel to the rotational axis of the wheel assembly 200), the flange 216 may be substantially perpendicular to the body 215, and thus the first aperture 213 and the second aperture 214 may lie in substantially perpendicular planes. In various embodiments, the retainer 210 also includes a shoulder 218, which may be positioned at the first end 211, at the second end 212, or along the body 215, and the shoulder 218 may be configured to engage the torque bar 220 in order to maintain the retainer 210 in a desired position and/or orientation relative to the torque bar 220.

Figure 4:
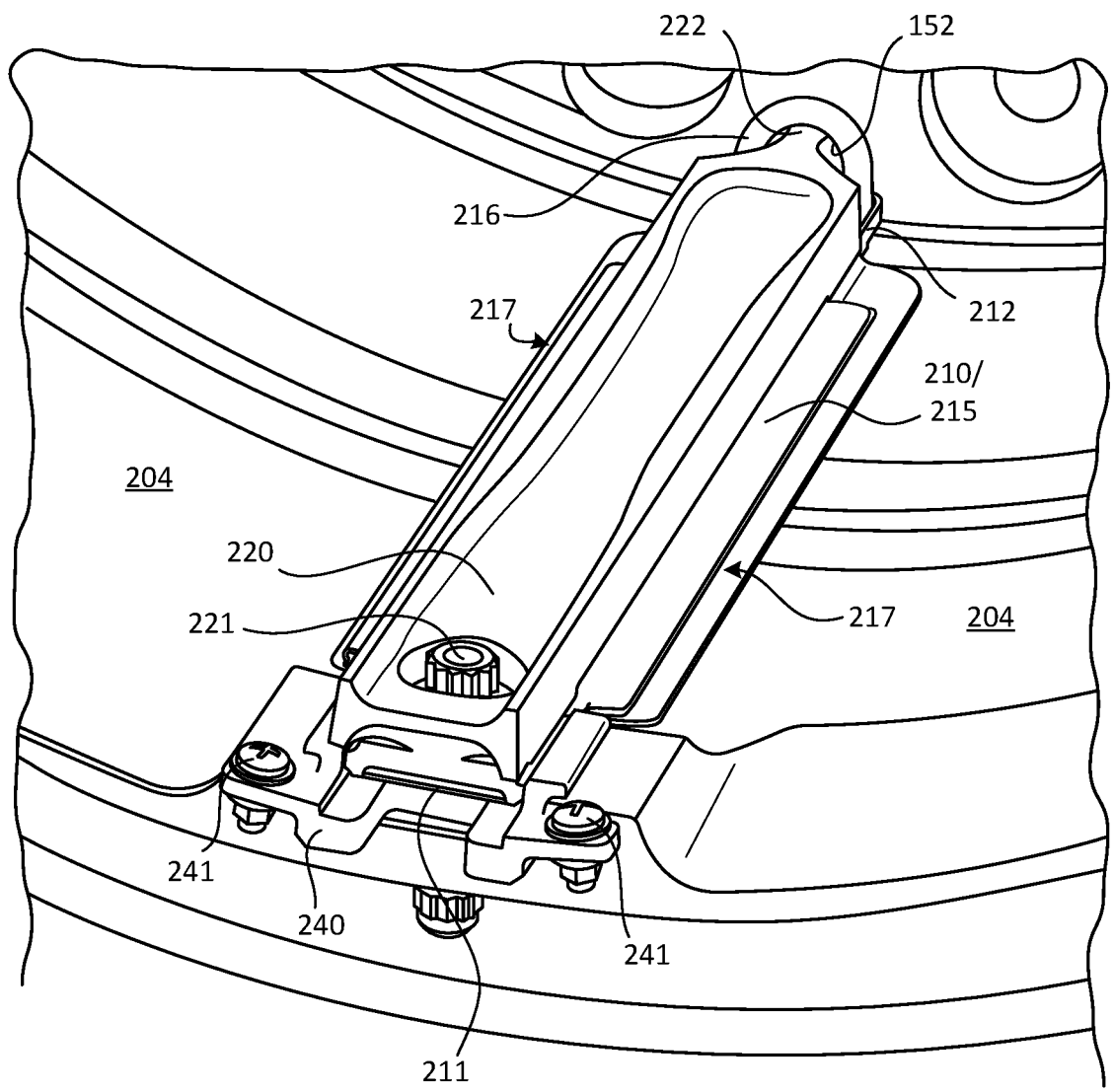
FIG. 4 is a perspective view of a torque bar and a retainer for a segmented annular heat shield coupled to an inboard wheel portion of a wheel assembly, in accordance with various embodiments.

In various embodiments, and with reference to FIG. 4, a view of the retainer 210 disposed between the torque bar 220 and the radially inward surface of the rim 204 of the inboard wheel portion 201 (FIG. 2) is provided. In FIG. 2 the heat shield segments have yet to be installed, and further details pertaining to the installation/assembly method are provided below with reference to FIG. 8. In various embodiments, the wheel assembly 200 may further include a torque bar spacer 240 coupled to an inboard end of the torque bar 220. The first end 211 of the retainer 210 may be compressed between the inboard end of the torque bar 220 and the torque bar spacer 240 (compression may be produced via the preloaded/tensioned torque bar bolt 221). The torque bar spacer 240 may include one or more fasteners 241 for securing the respective heat shield segments to the inboard end of the torque bar 220. That is, in response to the individual heat shield segments being installed between adjacent retainer 210, the inboard edge of the heat shield segments may be secured from sliding by coupling said segments to the torque bar spacer 240 using fasteners 241.

Figure 5:
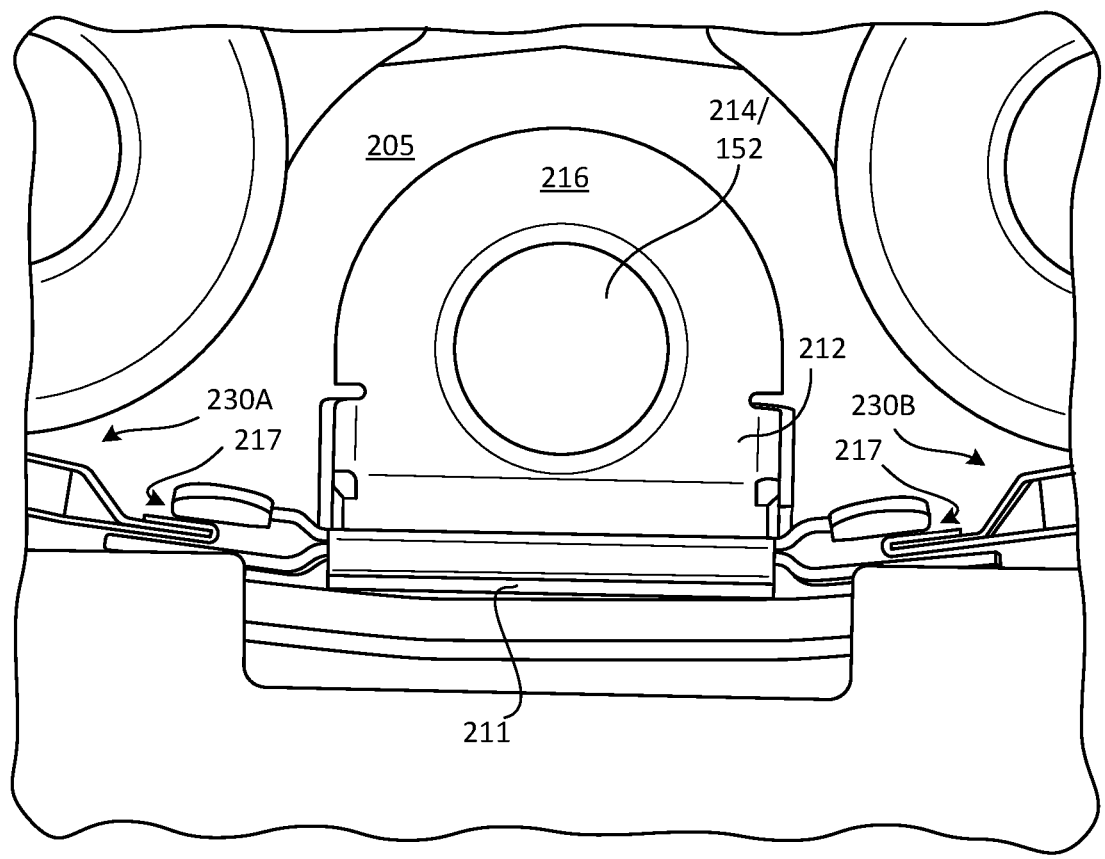
FIG. 5 is an axial view of a retainer, with a torque bar not shown, securing adjacent heat shield segments of a segmented annular heat shield, in accordance with various embodiments.

In various embodiments, and with reference to FIG. 5, an axial-looking view of the retainer 210 is provided, with adjacent heat shield segments 230A, 230B being secured to the retainer 210. That is, corresponding edges of the heat shield segments 230A, 230B are received into the longitudinal sides 217 (e.g., grooves) of the retainer 210, according to various embodiments. Engagement between the edges of the heat shield segments 230A, 230B and the longitudinal sides 217 of the retainer 210 may be an interference fit. In FIG. 5, the torque bar is omitted in order to clearly show the elements/features of the retainer 210. Thus, FIG. 5 shows how the aperture 214 defined in the flange 216 at the second end 212 of the retainer is aligned with the torque bar retention slot 152 defined in the disk 205 (e.g., web) of the inboard wheel portion 201 (FIG. 2), according to various embodiments.

Figure 6A:
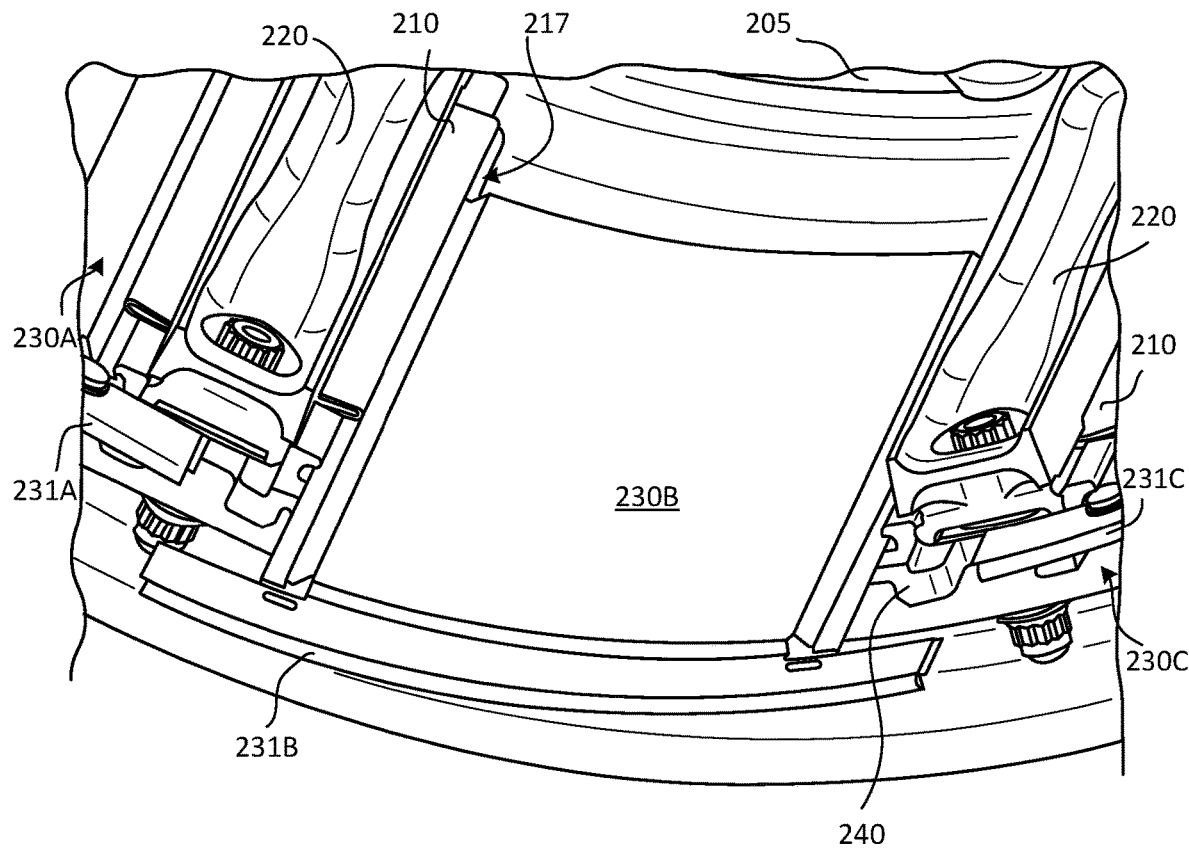
FIGS. 6A and 6B show a heat shield segment being installed between adjacent retainers, in accordance with various embodiments.
Figure 6B:
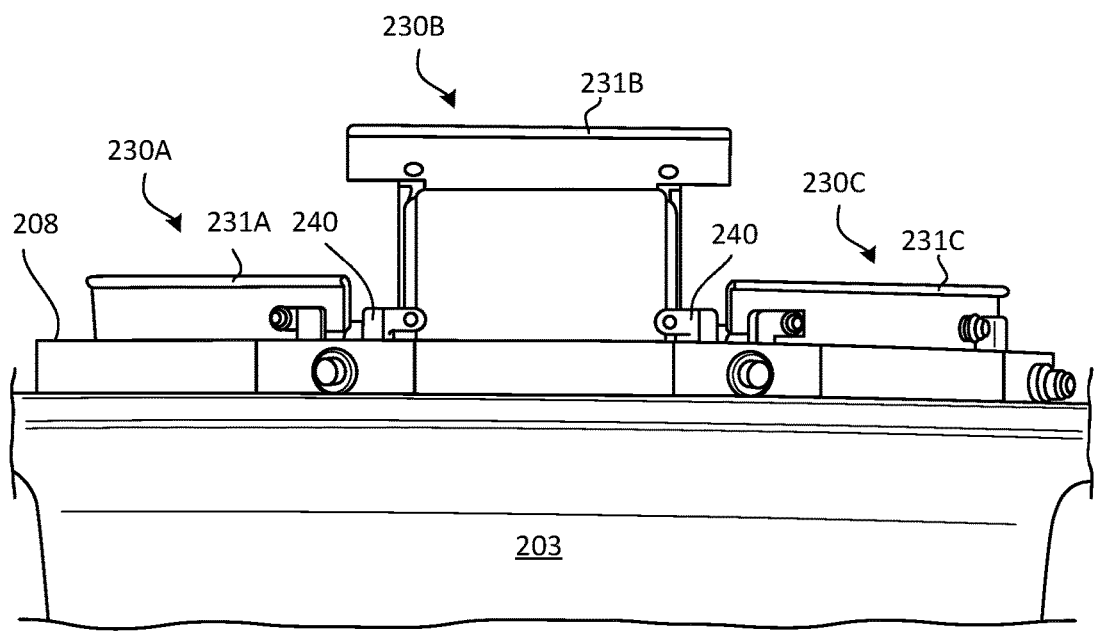

In various embodiments, and with reference to FIGS. 6A and 6B, multiple heat shield segments 230A, 230B, 230C are provided, with one of the heat shield segments (230B) shown in a partially installed state. More specifically, FIGS. 6A and 6B, according to various embodiments, show how the individual heat shield segments may be installed. With the retainers 210 and the torque bars 220 installed/mounted to the inboard wheel portion 201 (FIG. 2), the individual heat shield segments, such as heat shield segment 230B, may be aligned and engaged with the longitudinal sides 217 of the circumferentially adjacent retainers 210 and may be subsequently slid along the longitudinal sides 217 of the retainers 210 in an axially outboard direction until an outboard edge of the heat shield segment 230B is adjacent the disk 205 of the inboard wheel portion 201. Accordingly, the wheel assembly 200 may include a plurality of pairs of torque bars 220 and retainers 210, with each pair being circumferentially distributed around the radially inward surface of the rim 204 (FIG. 2) and with each heat shield segment of the plurality of heat shield segments 230A, 230B, 230C being disposed and secured between circumferentially adjacent retainers 210.

In various embodiments, and with reference to FIGS. 2, 6A, and 6B, the inboard edges 231A, 231B, 231C of the plurality of heat shield segments 230A, 230B, 230C collectively form a chin ring of the wheel assembly. The chin ring may be hoop/ring that extends farther inboard (see FIG. 6B) than the inboard lip 208 of the inboard wheel portion 201 of the wheel assembly 200. The chin ring may provide a thermal barrier to prevent heat radiation from reaching a tire disposed around the wheel in the tube-well 203.

Figure 7:
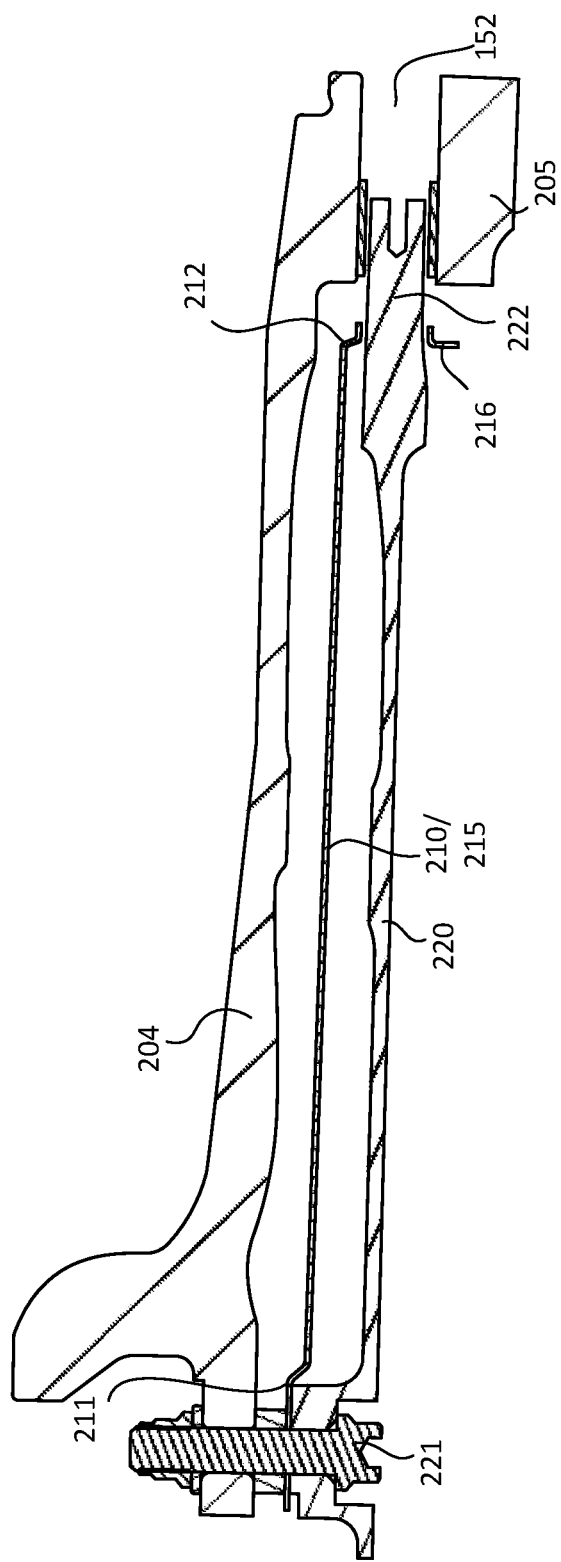
FIG. 7 shows a cross-section of a torque bar and a retainer disposed radially between the torque bar and a rim of an inboard wheel portion, in accordance with various embodiments.

In various embodiments, and with reference to FIG. 7, a cross-section of the torque bar 220 and the retainer 210 is provided. In various embodiments, a longitudinal axis of the retainer 210 may not be exactly parallel with a longitudinal axis of the torque bar 220. Said differently, the second end 212 of the retainer 210 may be radially inward of the first end 211. Such a configuration may be to ensure clearance between the second end 212 of the retainer 210 and the rim 204 of the wheel. Further, such a configuration may promote convective heat flow out of the inboard side of the wheel. That is, hot airflow may engage the angled/inclined surface of the retainer 210 and may be directed inboard along the retainer 210 to escape the wheel cavity. In various embodiments, the retainer 210 may be oriented in a slightly radially inward direction from the first end 211 to the second end 212 in order to more securely engage the outboard ends of the heat shield segments. Further, the retainer 210 may, in addition to providing a means for retaining the heat shield segments, function as a heat shield by dividing the volume radially outward of the torque bar 220 into two volumes. That is, the retainer 210 may define two air gaps 219A, 219B between the torque bar 220 and the radially inward surface of the rim 204.

Figure 8:
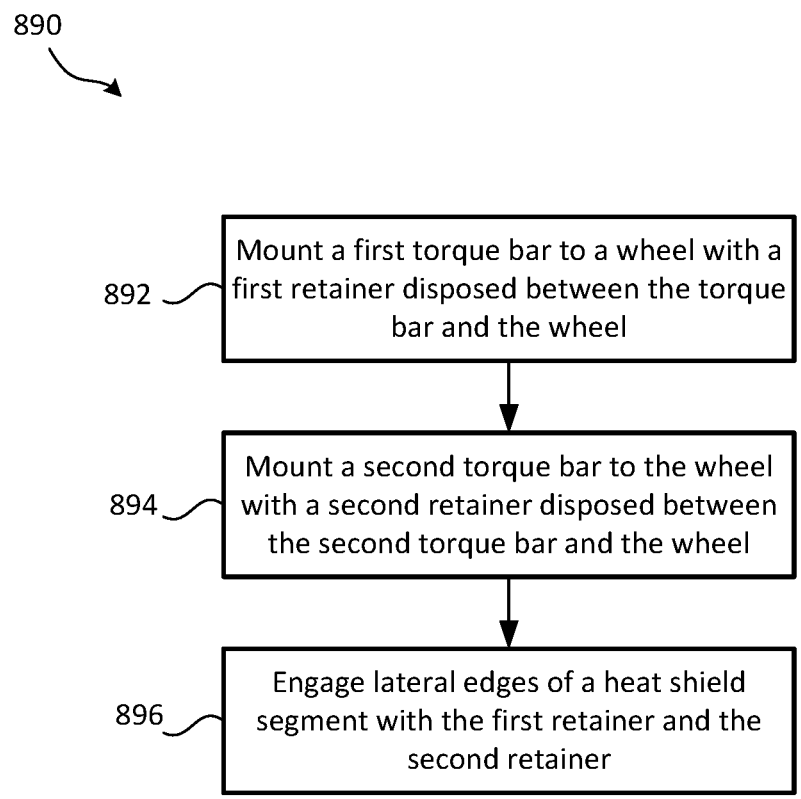
FIG. 8 is a schematic flow chart diagram of a method of assembling a wheel assembly, in accordance with various embodiments.
Figure 9A:
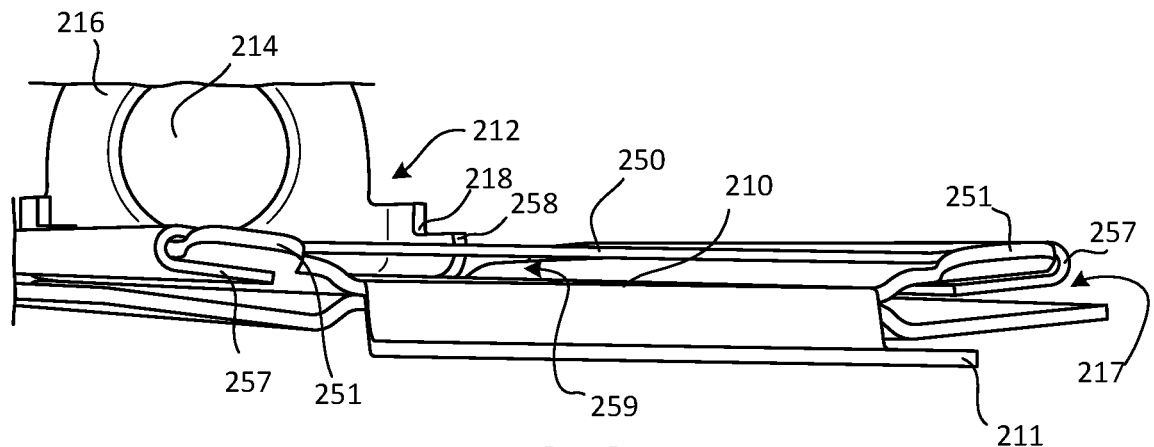
FIGS. 9A, 9B, 9C, and 9D are various views of a cover coupled to a retainer for a segmented annular heat shield, in accordance with various embodiments.
Figure 9B:
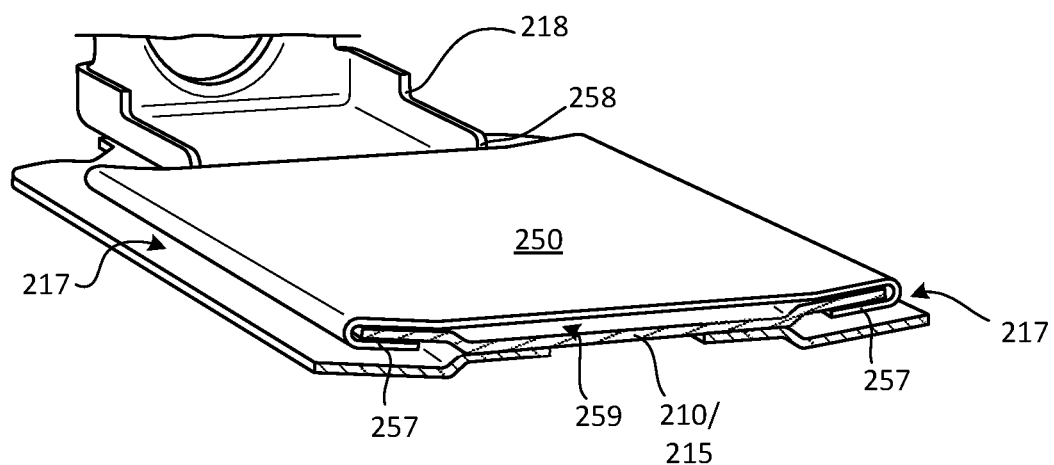
Figure 9C:
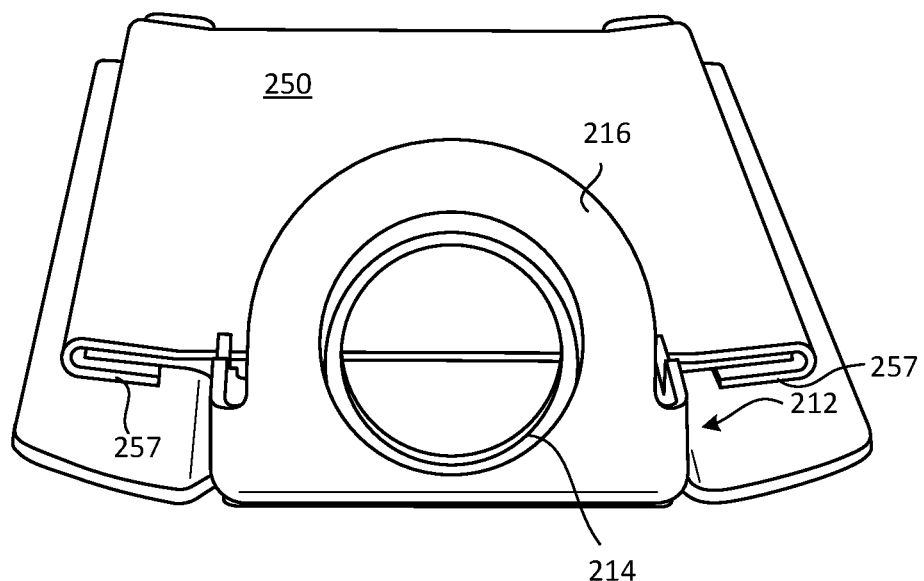
Figure 9D:
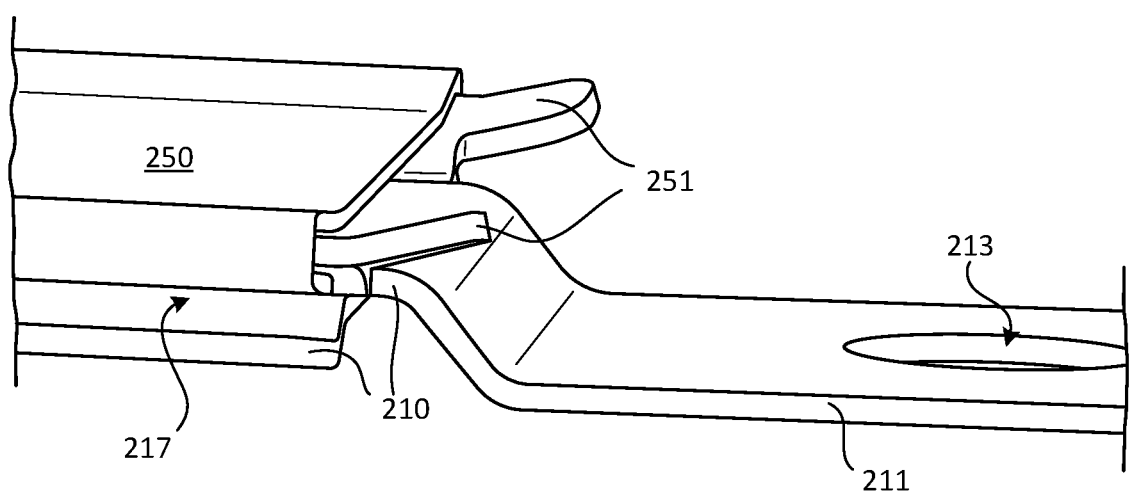

In various embodiments, and with reference to FIG. 8, a schematic flow chart diagram of a method 890 of assembling a wheel assembly is provided. The method 890 may include mounting a first torque bar to a wheel with a first retainer disposed between the torque bar and the wheel at step 892. The method 890 may further include mounting a second torque bar to wheel with a second retainer disposed between the second torque bar and the wheel at step 894. Still further, the method 890 may include engaging lateral edges of a heat shield segment with the first retainer and the second retainer at step 896.

In various embodiments, steps 892 and 894 include radially positioning the first and second retainers, respectively, between the respective torque bars and a radially inward surface of an inboard wheel portion of the wheel. In various embodiments, step 896 includes axially sliding, in an outboard direction, the heat shield segment between the first retainer and the second retainer such that the lateral edges of the segment slide through grooves respectively defined by the first retainer and the second retainer. In various embodiments, the method 890 further includes, before step 892, inserting a torque bar pin of the first torque bar through an aperture defined in a flange at an end of the first retainer. In such embodiments, mounting the first torque bar to the inboard wheel portion may comprise inserting the first torque bar pin into a torque bar retention slot defined in a web of the inboard wheel portion of the wheel assembly.

In various embodiments, and with reference to FIGS. 9A, 9B, 9C, and 9D, a cover 250 for the retainer 210 is provided. Generally, the cover 250 provides additional thermal/heat protection by defining an additional air gap 259 between the retainer 210 and the cover 250. In various embodiments, the cover 250 is coupled to the retainer 210. The cover 250 may be coupled to and may extend over at least the body 215 of the retainer 210, and thus the cover 250 and the retainer 210 together may improve the thermal protection of the wheel assembly by inhibiting heat transfer through the retainer 210 and cover 250.

In various embodiments, the cover 250 is detachably coupled to the body 215 of the retainer 210, and thus once installed may be generally disposed between the first end 211 and the second 212 of the retainer 210. For example, the cover 250 may be configured to slide over/onto the body 215 of the retainer 210. The cover 250 may have opposing longitudinal edges 257 that respectively wrap around and are disposed within the groove 217 of the opposing longitudinal sides of the retainer 210. Thus, the opposing longitudinal edges 257 of the cover 250 may be referred to herein as wrap-around edges 257, and these wrap-around edges 257 may be slid into engagement with the opposing longitudinal sides 217 of the retainer 210.

In various embodiments, the body 215 of the retainer 210 includes at least one tab 251, disposed proximate the first end 211 of the retainer 210, that is configured to be bent or otherwise plastically deformed after the cover 250 has been slid onto the body 215 of the retainer 210, thereby securing the cover 250 in place. Further, the body 215 and/or the second end 212 of the retainer 210 may also include a shoulder 258 against which the cover 250 engages such that the cover 250 is held in place between the shoulder 258 and the at least one tab 251 to maintain at least one of a position and an orientation of the cover 250 relative to the retainer 210. This shoulder 258, according to various embodiments, is different than above mentioned shoulder 218. That is, shoulder 258 may be a first shoulder, and shoulder 218 may be a second shoulder.

Figure 10:
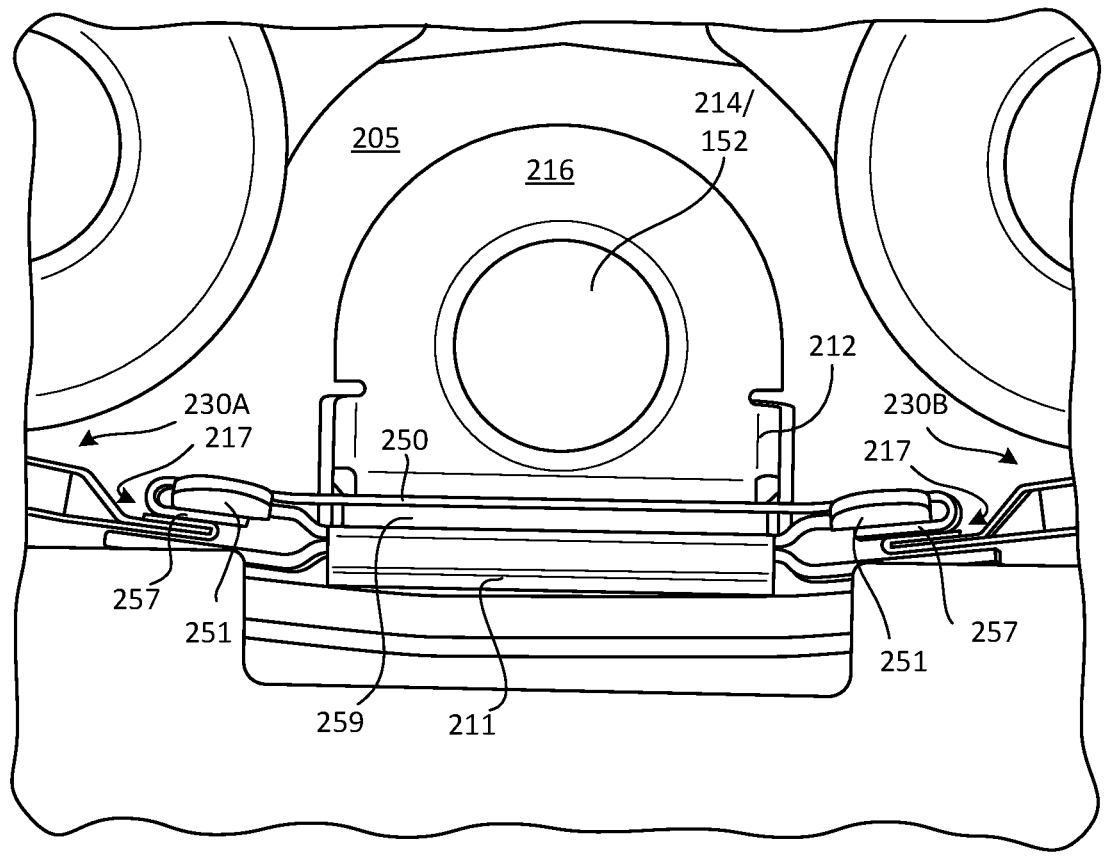
FIG. 10 is an axial view of a cover coupled to a retainer, with a torque bar not shown, securing adjacent heat shield segments of a segmented annular heat shield, in accordance with various embodiments.

In various embodiments, and with reference to FIG. 10, an axial-looking view of the retainer 210 and cover 250 is provided, with adjacent heat shield segments 230A, 230B being secured to the retainer 210. In FIG. 10, the torque bar 220 is omitted in order to clearly show the elements/features of the retainer 210 and the cover 250. Corresponding edges of the heat shield segments 230A, 230B are received into the longitudinal sides 217 (e.g., grooves) of the retainer 210, according to various embodiments. Engagement between the edges of the heat shield segments 230A, 230B and the longitudinal sides 217 of the retainer 210 may be an interference fit. In various embodiments, the wrap-around edges 257 of the cover 250 are disposed in the grooves 217, and thus the wrap-around edges 257 of the cover 250 may contact the corresponding edges of the heat shield segments. Accordingly, the compression/interference fit of the edges of the heat shield segments 230A, 230B may be caused by direct contact between a surface of the grooves 217 of the retainer 210 and the wrap-around edges 257 of the cover 250. In various embodiments, the cover 250 is disposed radially inward of the retainer 210.

Figure 11:
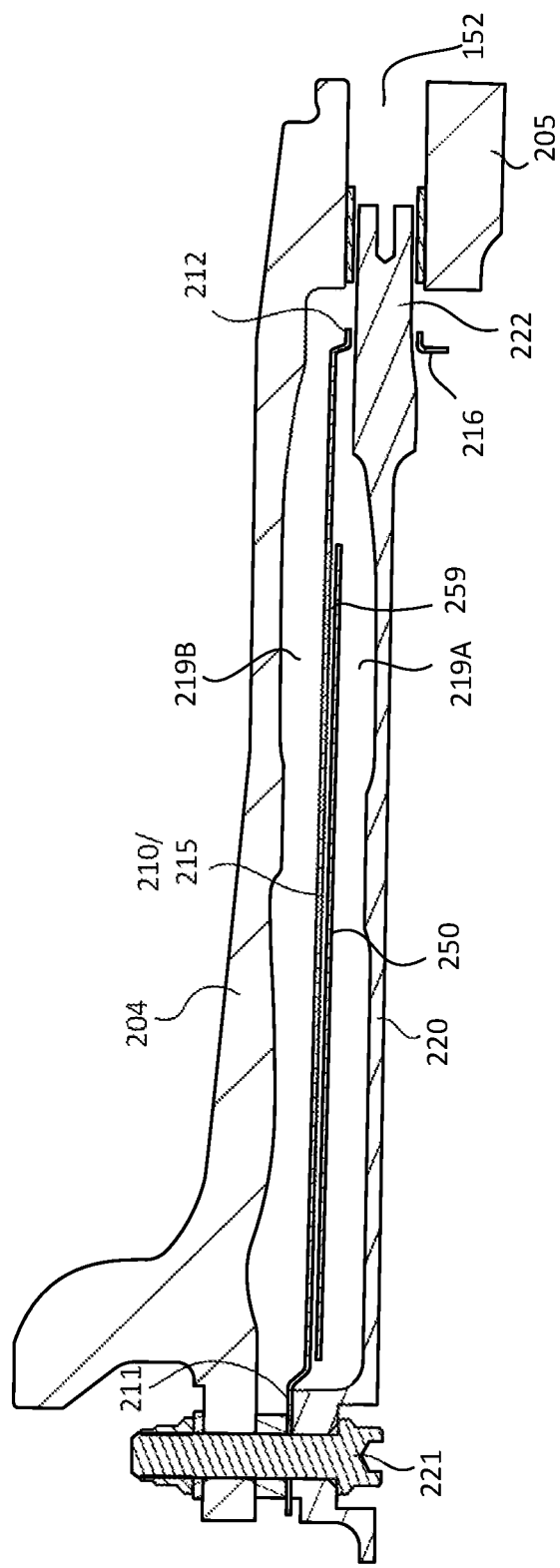
FIG. 11 shows a cross-section of a torque bar, a retainer, and a cover for the retainer disposed radially inward of a rim of an inboard wheel portion, in accordance with various embodiments.

In various embodiments, and with reference to FIG. 11, a cross-section of the torque bar 220, the cover 250, and the retainer 210 is provided. The inclusion of the cover 250 may, as mentioned above, inhibit heat transfer through the area radially outward of the torque bar 220 by defining an extra air gap. That is, the volume radially outward of the torque bar 220 may be divided into three air gaps. For example, a first air gap 219A may be defined between the torque bar 220 and the cover 250, a second air gap 259 may be defined between the cover 250 and the retainer 210, and a third air gap 219B may be defined between the retainer 210 and the radially inward surface of the rim 204 of the inboard wheel portion 201 (FIG. 2).

Figure 12:
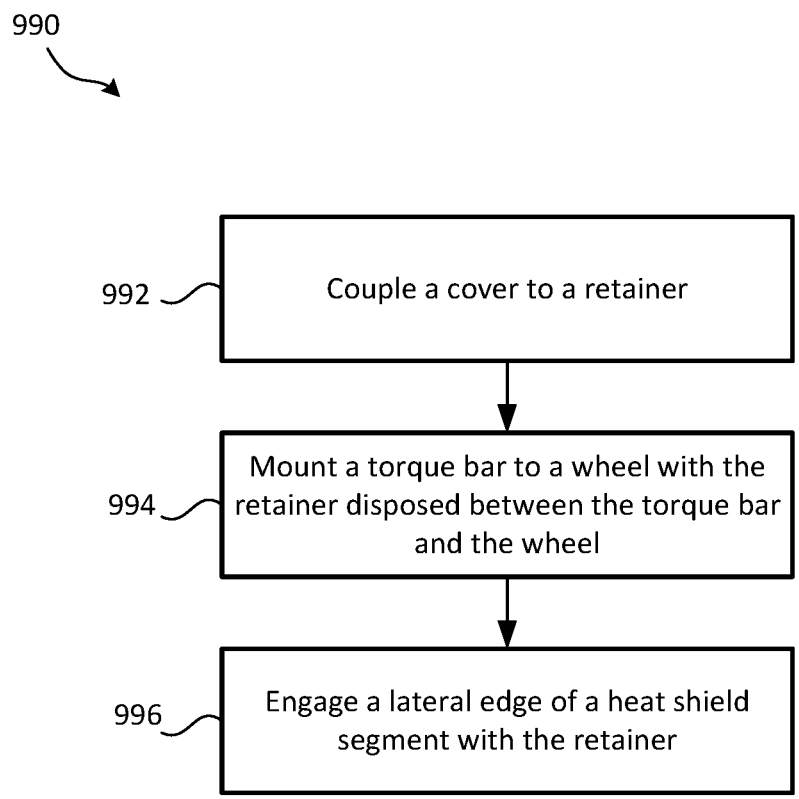
FIG. 12 is a schematic flow chart diagram of a method of assembling a wheel assembly, in accordance with various embodiments.

In various embodiments, and with reference to FIG. 12, a schematic flow chart diagram of a method 990 of assembling a wheel assembly is provided. The method 990 may include coupling a cover to a retainer at step 992 and mounting a torque bar to a wheel, with the retainer disposed between the torque bar and the wheel at step 994. The method 990 may further include engaging a lateral edge of a heat shield segment with the retainer at step 996. Three air gaps (e.g., a first air gap, a second air gap, and a third air gap) may be defined between the torque bar and the wheel.

In various embodiments, step 994 includes mounting the torque bar to an inboard wheel portion of the wheel assembly such that the retainer is disposed between the torque bar and a radially inward surface of a rim of the inboard wheel portion. In various embodiments, step 992 of the method 990 includes sliding the cover over a body of the retainer and subsequently bending at least one tab to secure the cover in place.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A retainer for a segmented annular heat shield of a wheel, the retainer comprising:
   a first end;
   a second end opposite the first end, wherein both the first end and the second end are configured to be coupled to at least one of the wheel and a torque bar;
   a body extending between the first end and the second end, the body comprising opposing longitudinal sides configured to respectively engage and secure a respective heat shield segment of the segmented annular heat shield, wherein each of the opposing longitudinal sides comprises a groove for receiving an edge of the respective heat shield segment; and
   a cover coupled to and extending over at least the body, wherein an air gap is defined between the body and the cover, wherein the cover comprises opposing longitudinal edges that respectively wrap around and are disposed within the groove.

2. The retainer of claim 1, wherein the cover is detachably coupled to the body and thus extends between the first end and the second end.

3. The retainer of claim 2, wherein the cover is configured to slide onto the body.

4. The retainer of claim 3, wherein the body comprises at least one tab, disposed proximate the first end, configured to be bent after the cover is slid onto the body to secure the cover in place.

5. A wheel assembly comprising:
   an inboard wheel portion comprising a rim and a disk, wherein a radially inward surface of the rim and an inboard surface of the disk define a wheel well cavity configured to house a brake assembly;
   a torque bar of the brake assembly mounted to the inboard wheel portion;
   a retainer coupled to the torque bar and disposed radially between the torque bar and the radially inward surface of the rim of the inboard wheel portion, the retainer comprising opposing longitudinal sides configured to respectively engage and retain a respective heat shield segment of a segmented annular heat shield; and
   a cover coupled to at least a portion of the retainer, wherein the cover is disposed radially between the torque bar and the retainer;
   wherein a first air gap, a second air gap, and a third air gap are defined between the torque bar and the radially inward surface of the rim of the inboard wheel portion, wherein the first air gap is defined between the torque bar and the cover, wherein the second air gap is defined between the cover and the retainer, wherein the third air gap is defined between the retainer and the radially inward surface of the rim of the inboard wheel portion.

6. The wheel assembly of claim 5, each of the opposing longitudinal sides of the retainer comprises a groove for receiving an edge of the respective heat shield segment.

7. The wheel assembly of claim 6, wherein the cover comprises opposing longitudinal edges that respectively wrap around and are disposed within the groove.

8. The wheel assembly of claim 5, wherein the cover is detachably coupled to the retainer.

9. The wheel assembly of claim 8, wherein:
   the retainer comprises a first end, a second end opposite the first end, and a body extending between the first end and the second end;
   the cover is configured to slide onto the body; and
   the body comprises at least one tab, disposed proximate the first end, configured to be bent after the cover is slid onto the body to secure the cover in place.

10. The wheel assembly of claim 9, wherein at least one of the body and the second end comprises a shoulder against which the cover is engaged, wherein the cover is held between the shoulder and the at least one tab to maintain at least one of a position and an orientation of the cover relative to the retainer.

11. The wheel assembly of claim 10, wherein the shoulder is a first shoulder, wherein at least one of the body, the first end, and the second end comprises a second shoulder configured to engage the torque bar to maintain at least one of a position and an orientation of the retainer relative to the torque bar.

12. A method of assembling a wheel assembly, the method comprising:
   coupling a cover to a retainer, wherein coupling the cover to the retainer comprises sliding the cover over a body of the retainer and subsequently bending at least one tab to secure the cover in place;
   mounting a torque bar to an inboard wheel portion of the wheel assembly such that the retainer is disposed between the torque bar and a radially inward surface of a rim of the inboard wheel portion; and
   engaging a lateral edge of a heat shield segment with the retainer;
   wherein a first air gap, a second air gap, and a third air gap are defined between the torque bar and the radially inward surface of the rim of the inboard wheel portion.

13. A retainer for a segmented annular heat shield of a wheel, the retainer comprising:
   a first end;
   a second end opposite the first end, wherein both the first end and the second end are configured to be coupled to at least one of the wheel and a torque bar;
   a body extending between the first end and the second end, the body comprising opposing longitudinal sides configured to respectively engage and secure a respective heat shield segment of the segmented annular heat shield; and
   a cover coupled to and extending over at least the body, wherein an air gap is defined between the body and the cover, wherein the cover is detachably coupled to the body and thus extends between the first end and the second end, wherein the cover is configured to slide onto the body, wherein the body comprises at least one tab, disposed proximate the first end, configured to be bent after the cover is slid onto the body to secure the cover in place, wherein at least one of the body and the second end comprises a shoulder against which the cover is engaged, wherein the cover is held between the shoulder and the at least one tab to maintain at least one of a position and an orientation of the cover relative to the retainer.

14. The retainer of claim 13, wherein the first end defines an aperture for receiving a torque bar bolt.

15. The retainer of claim 14, wherein:
the aperture is a first aperture;
the second end comprises a flange;
the flange defines a second aperture through which a torque bar pin of the torque bar is configured to extend; and
the flange extends substantially perpendicular to the body such that the first aperture and the second aperture lie in perpendicular planes.

16. The retainer of claim 13, wherein the shoulder is a first shoulder, wherein at least one of the body, the first end, and the second end comprises a second shoulder configured to engage the torque bar to maintain at least one of a position and an orientation of the retainer relative to the torque bar.

* * * * *